United States Patent [19]

Hill et al.

[11] Patent Number: 5,593,478
[45] Date of Patent: Jan. 14, 1997

[54] FLUID FRACTIONATOR

[75] Inventors: Charles C. Hill, Del Mar; Theodore B. Hill, San Diego, both of Calif.

[73] Assignee: Sequal Technologies, Inc., San Diego, Calif.

[21] Appl. No.: 314,213

[22] Filed: Sep. 28, 1994

[51] Int. Cl.⁶ .................................................. B01D 53/053
[52] U.S. Cl. ............................... 96/111; 96/115; 96/124; 96/130; 96/133; 96/144; 96/149
[58] Field of Search ............................. 96/109–117, 124, 96/126–130, 133, 144, 149

[56] References Cited

U.S. PATENT DOCUMENTS

| | | | |
|---|---|---|---|
| 4,342,573 | 8/1982 | McCombs et al. | 96/109 |
| 4,378,982 | 4/1983 | McCombs | 96/117 |
| 4,491,459 | 1/1985 | Pinkerton | 96/113 |
| 4,576,616 | 3/1986 | Mottram et al. | 96/113 X |
| 4,648,888 | 3/1987 | Rowland | 96/110 X |
| 4,802,899 | 2/1989 | Vrana et al. | 96/109 |
| 4,806,132 | 2/1989 | Campbell | 55/16 |
| 4,813,979 | 3/1989 | Miller et al. | 96/115 X |
| 4,822,384 | 4/1989 | Kato et al. | 96/110 |
| 4,925,464 | 5/1990 | Rabenau et al. | 96/124 |
| 5,112,367 | 5/1992 | Hill | 96/124 X |
| 5,268,021 | 12/1993 | Hill et al. | 96/124 X |
| 5,366,541 | 11/1994 | Hill et al. | 96/124 |
| 5,441,559 | 8/1995 | Petit et al. | 96/130 X |
| 5,496,388 | 3/1996 | Tellier | 55/210 |

FOREIGN PATENT DOCUMENTS

| | | | |
|---|---|---|---|
| 0135921 | 4/1985 | European Pat. Off. | 96/109 |
| 63-016027 | 1/1988 | Japan | 96/113 |
| 4-016212 | 1/1992 | Japan | 96/109 |
| 5-084418 | 4/1993 | Japan | 96/109 |
| WO94/15698 | 7/1994 | WIPO | 96/130 |

OTHER PUBLICATIONS

A Design Engineer's Guide to Smart Air Technology, The Marriage of Electronics to Pneumatics; Gast Manufacturing.

*Primary Examiner*—Robert Spitzer
*Attorney, Agent, or Firm*—Ellsworth R. Roston; Charles H. Schwartz

[57] ABSTRACT

A rotary valve at the inlets of a plurality of columns cyclically (1) selects first columns on a cyclic basis to receive compressed air, adsorb nitrogen and other components in the compressed air and pass oxygen and argon to a user (e.g. patient), second columns to desorb the adsorbed components in such columns and (3) third columns to equalize pressures where the first columns change progressively to the second columns and vice versa. A compressor having adjustable characteristics and regulated in an open or closed loop introduces the compressed air through the valve to the first columns to provide an adjustable air flow for obtaining a prescribed oxygen flow to the user. An indication may be provided when the compressor characteristics regulated for obtaining the prescribed oxygen flow rate are outside particular limits. The valve may have a variable speed related to the compressor flow variations to regulate the air pressure in the columns in accordance with the air flow rate into the columns. A variable orifice in a valve in each column outlet becomes constricted with decreases in the oxygen flow rate in each column, thereby further regulating the oxygen pressure in such column. A porous plug in a closed chamber receiving the desorbed pressurized components releases such components slowly, without pulsatile noise, to the atmosphere. The equipment accordingly produces the desired oxygen flow rate with minimal power consumption, minimal noise and optimal efficiency, reliability and life span. The equipment may be designed to pass other components than oxygen.

72 Claims, 9 Drawing Sheets

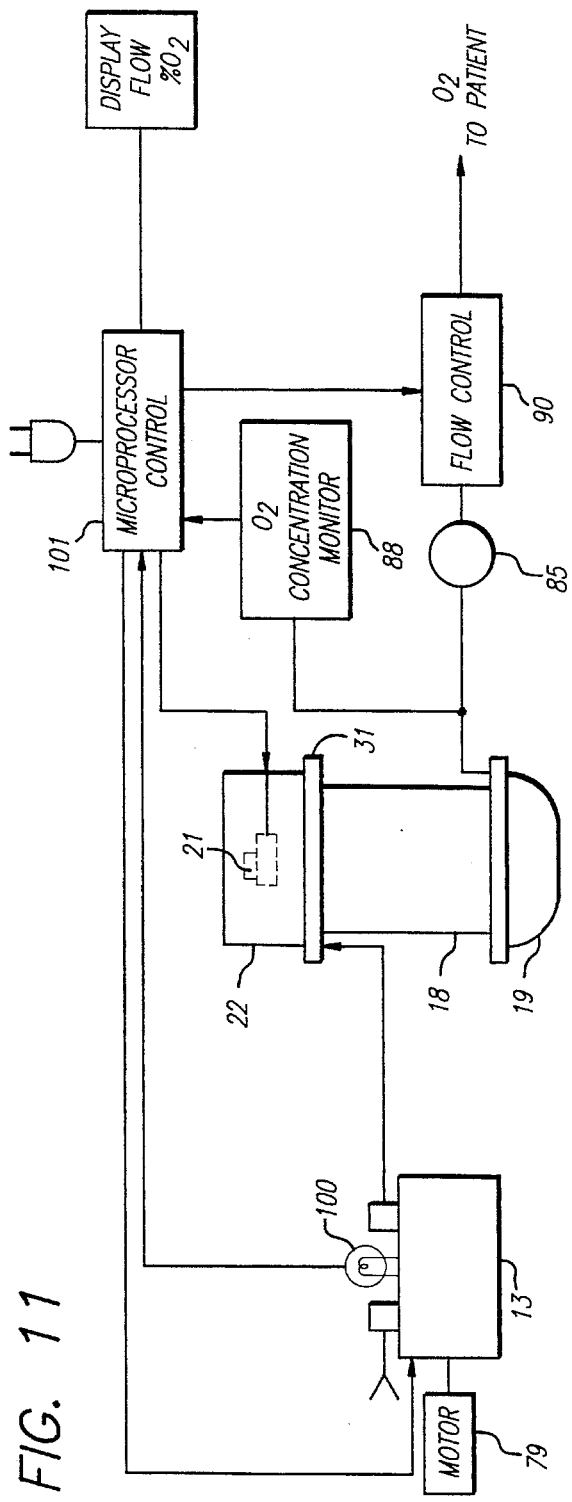
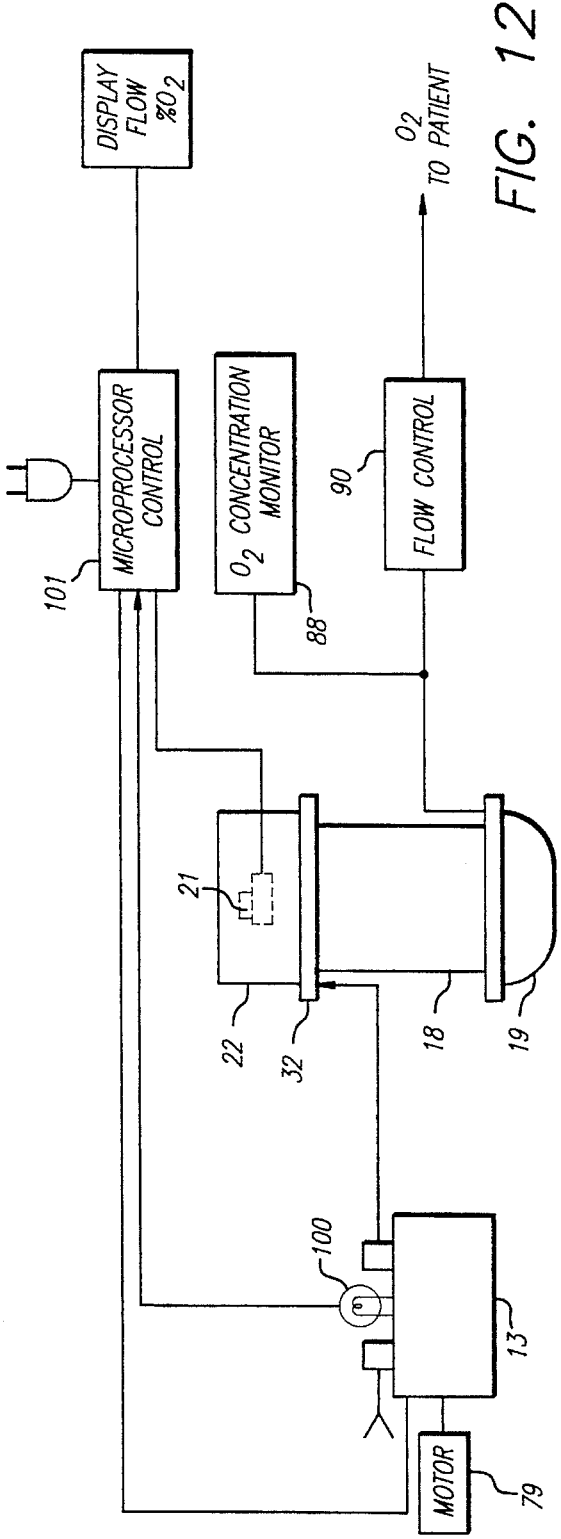

FLUID FRACTIONATOR

This invention relates to apparatus for, and methods of, purifying a fluid by periodically/cyclically passing a particular component in the fluid through a molecular sieve and adsorbing other components in the fluid in the molecular sieve and subsequently periodically/cyclically desorbing such other components from the molecular sieve. The invention further relates to apparatus for, and methods of, passing oxygen in compressed air (and argon) for introduction to a patient and for adsorbing nitrogen and the other components in the compressed air and subsequently desorbing the adsorbed components to the atmosphere. The invention particularly relates to apparatus for providing any prescribed rate of flow of oxygen with minimal power consumption, minimal noise and optimal efficiency, reliability and life span.

Apparatus is in existence for receiving a fluid such as compressed air, for separating the oxygen from the air and for passing the oxygen for subsequent use as by a patient. The apparatus also includes material in a molecular sieve for adsorbing the nitrogen and the other components in the compressed air. When the oxygen separated from the compressed air has been passed, the adsorbed components in the compressed air are desorbed by release to the atmosphere. The apparatus can operate on a cyclic basis to continuously provide oxygen to a user such as a patient.

The oxygen can be used for many purposes. One of the primary uses of the oxygen is for providing oxygen to patients such as the elderly and those having asthma and emphysema. When the apparatus is used for such patients, the apparatus should have certain desirable characteristics. It should be able to provide the oxygen to each patient in a variable delivery rate and high concentration dependent upon the needs of the patient. It should be able to provide this oxygen in an efficient and reliable manner and with a minimal power consumption, particularly since many sick and elderly patients have only limited income and the electric power cost for operating the apparatus is substantial and significant. The apparatus should also operate quietly so as not to be offensive to the patient and to those around the patient. The apparatus should also have a long operative life without any breakdown. These parameters are particularly important because the apparatus operates continuously in the home environment without attendance.

The apparatus now in use fails to completely meet the criteria specified in the previous paragraph. The apparatus includes a compressor for introducing compressed air to columns which include a molecular sieve for passing oxygen and argon and for adsorbing nitrogen and other components in the compressed air and for subsequently desorbing the adsorbed components. In the apparatus now in use, the compressors are operated to deliver a constant maximum flow and concentration of oxygen regardless of the flow of oxygen prescribed for the user. The desired flow of oxygen to the patient is then adjusted by a throttling valve in the product bleed line to the user. As will be appreciated, this is inefficient if less than maximum flow capacity is needed, particularly since the compressor and the motor driving the compressor require a large amount of power.

The compressor generates a large amount of noise as it operates. This results partly from the operation of the motor and the compressor, particularly since the motor and the compressor is driven at a fixed high speed. It also results partly from the desorption to the atmosphere of the compressed fluid which is adsorbed in the columns. This release occurs almost instantaneously, thereby creating a noise/sound pulse every time that the compressed fluid in one of the columns is released to the atmosphere.

This invention provides a system which substantially overcomes the disadvantages in the apparatus of the prior art. In the system of this invention, the compressor operates at a speed, or with displacement characteristics, adjustable in accordance with the desired rate of oxygen flow to the user (e.g. the patient). The apparatus of this invention is also advantageous in that it releases the desorbed fluid to the atmosphere at a steady and controlled rate, thereby significantly reducing the noise generated from such release.

In one embodiment of the invention, a rotary valve at the inlets of a plurality of columns selects first columns on a cyclic basis to receive compressed air, adsorb nitrogen and other components in the compressed air and pass oxygen and argon to a user (e.g. patient). The valve also cyclically selects second columns to desorb the nitrogen and the other components in such columns and cyclically equalizes the pressure in third columns where the first columns change progressively to the second columns and vice versa.

A compressor having adjustable characteristics and regulated in an open or closed loop introduces the compressed air through the valve to the first columns to provide an adjustable air flow for obtaining a prescribed oxygen flow to the user. An indication may be provided when the compressor characteristics regulated for obtaining the prescribed oxygen flow rate are outside particular limits.

The valve may have a variable speed related to the compressor flow variations to regulate the air pressure in the columns in accordance with the air flow rate into the columns. A variable orifice in a valve in each column's outlet becomes constricted with decreases in the oxygen flow rate in each column, thereby further regulating the oxygen pressure in such column.

A porous plug in a closed chamber receiving the desorbed components releases such components slowly, without pulsatile noise, to the atmosphere. The equipment accordingly produces the desired oxygen flow rate with minimal power consumption, minimal noise and optimal efficiency, reliability and life span. The equipment may be designed to pass other components than oxygen.

In the drawings:

FIG. 11 is a schematic diagram of a closed loop system constituting another embodiment of the invention for use with the fluid fractionator shown in FIGS. 1–9 for regulating the variable characteristics of a compressor and other components to obtain a desired or prescribed rate of flow and concentration of a particular fluid component such as oxygen;

FIG. 12 is a schematic diagram of an open loop system constituting an additional embodiment of the invention for use with the fluid fractionator shown in FIGS. 1–9 for controlling the variable characteristics of a compressor and other components to obtain a desired or prescribed rate of flow and concentration of a particular fluid component such as oxygen;

Figure 17:
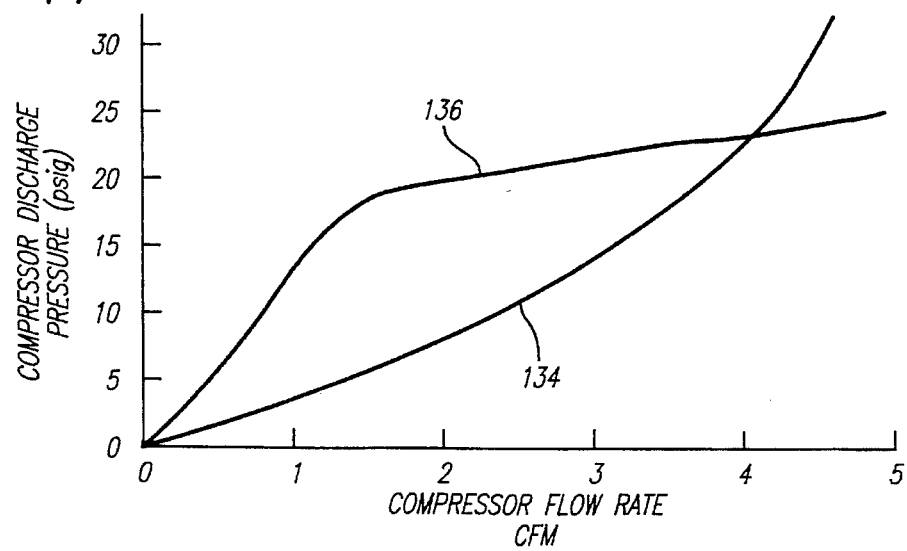
Figure 15:
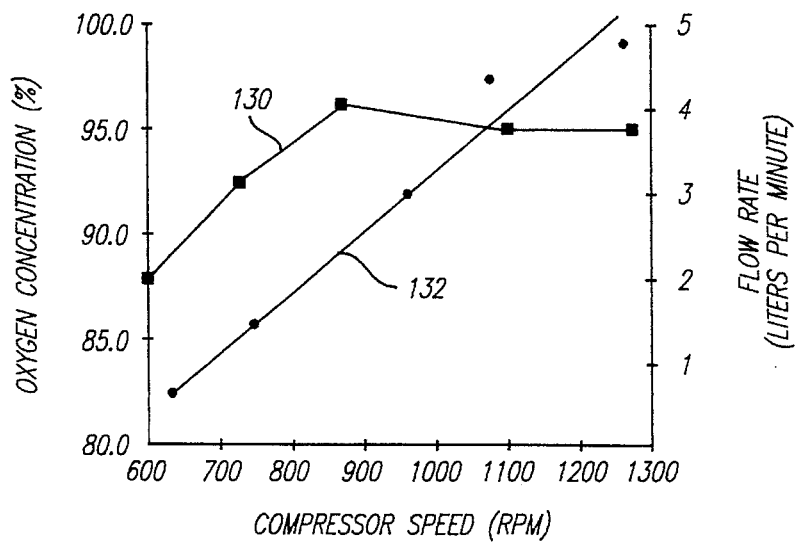
Figure 16:
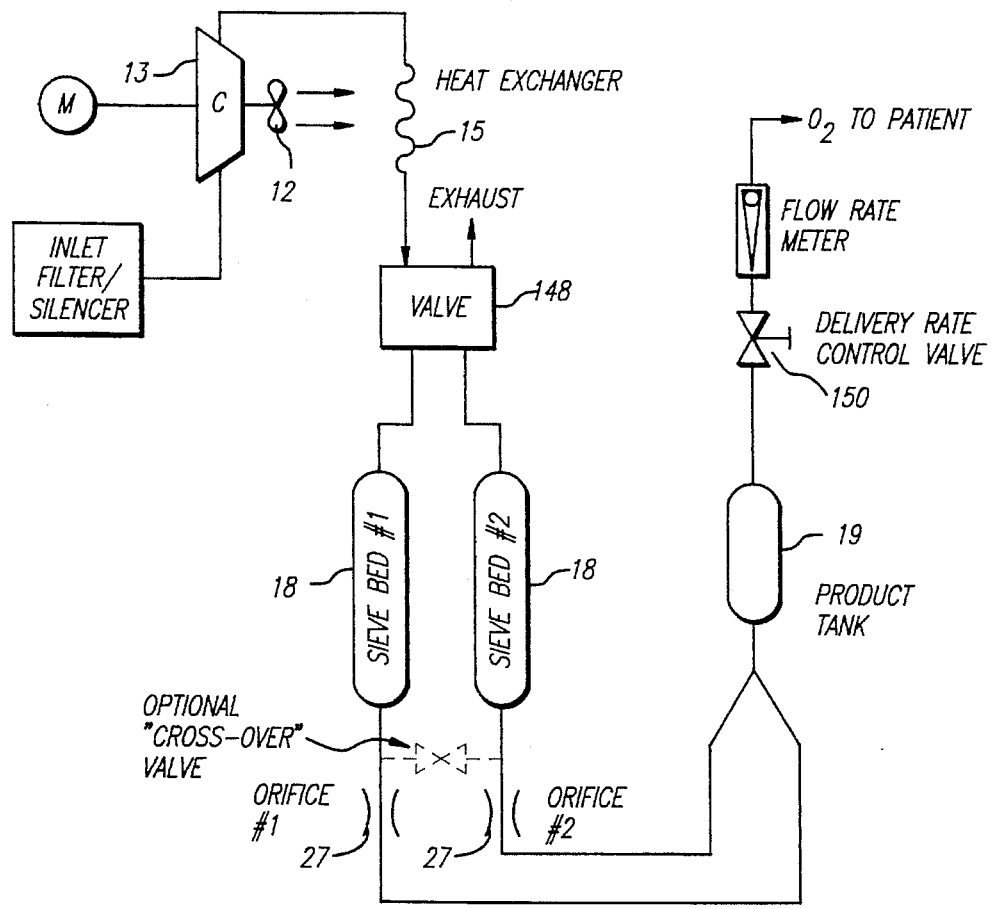

FIG. 15 provides curves showing (a) the relationship between different compressor speeds and the percentage of concentration of oxygen in the product flow from the fluid fractionator and (b) the relationship between different compressor speeds and the flow rate of oxygen to the product holding tank 19 in liters per minute; and FIG. 16 is a schematic diagram showing a fluid fractionator which may be considered as a conventional fluid fractionator of the prior art and which may be modified to incorporate the features of this invention; and FIG. 17 provides curves showing the relationship between compressor flow rates and compressor discharge pressures for a normal system of the prior art and for the system of this invention.

FIGS. 1–9 illustrate an oxygen-concentrating system, generally indicated at 10, which may be used in this invention and which is disclosed in the prior art in U.S. Pat. No. 5,268,021 issued to Charles C. Hill and Theodore B. Hill on Dec. 9, 1993, for an "Improved Fluid Fractionator" and assigned of record to the assignee of record of this application. The embodiment shown in FIGS. 1–9 of this application corresponds to the embodiment shown in FIGS. 1–9 of U.S. Pat. No. 5,268,021. In the prior art system shown in FIGS. 1–9, air is drawn from the atmosphere through an air inlet 6 into a dust filter 11 which removes dust from the air. The air is then compressed in a compressor 13 and the compressed air is introduced through a conduit 14 into a heat exchanger 15 which removes some of the heat produced during the compression. A fan 12 may be driven by the compressor 13 to remove heat from the heat exchanger 15.

The compressed air then passes into the inlet port 16 of a fluid fractionator, generally indicated at 20, which is included in this invention. The fluid fractionator 20 includes a product tank 19. Included in the tank 19 are a plurality of adsorber columns 18 (FIG. 3) the construction and operation of which will be described in detail subsequently. Oxygen (and argon) flow from the product tank 19 through an oxygen outlet 7 in FIG. 2.

Each column 18 separates the oxygen and argon in the compressed air from the other components in the compressed air and passes some of the oxygen and argon through an outlet port 17 (FIG. 1) to a dispensing conduit 22a. The oxygen and argon then pass through a valve 23 (which may be manually controlled) to a filter 24. The filter 24 may be a high efficiency particle arrestor (HEPA). The oxygen and argon then pass to a conduit 25a for use for one of a number of purposes. For example, the oxygen and argon may be introduced to a patient to increase the level of the oxygen in the blood of the patient.

Figure 1:
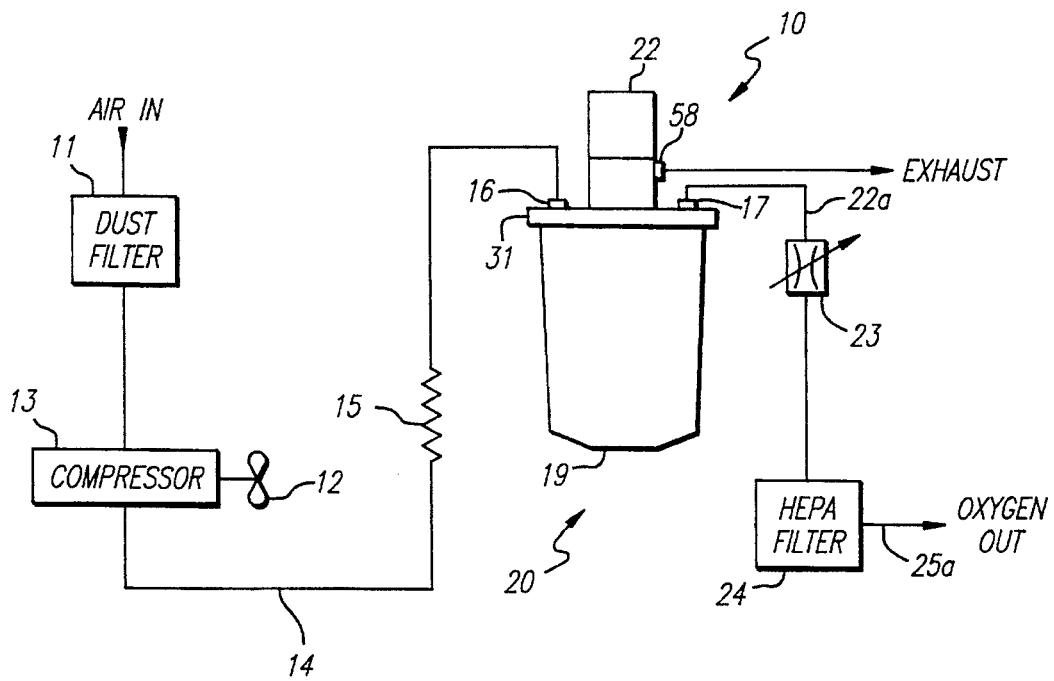
FIG. 1 is a schematic representation of a respiratory support system, including a fluid fractionator, of the prior art.
Figure 2:
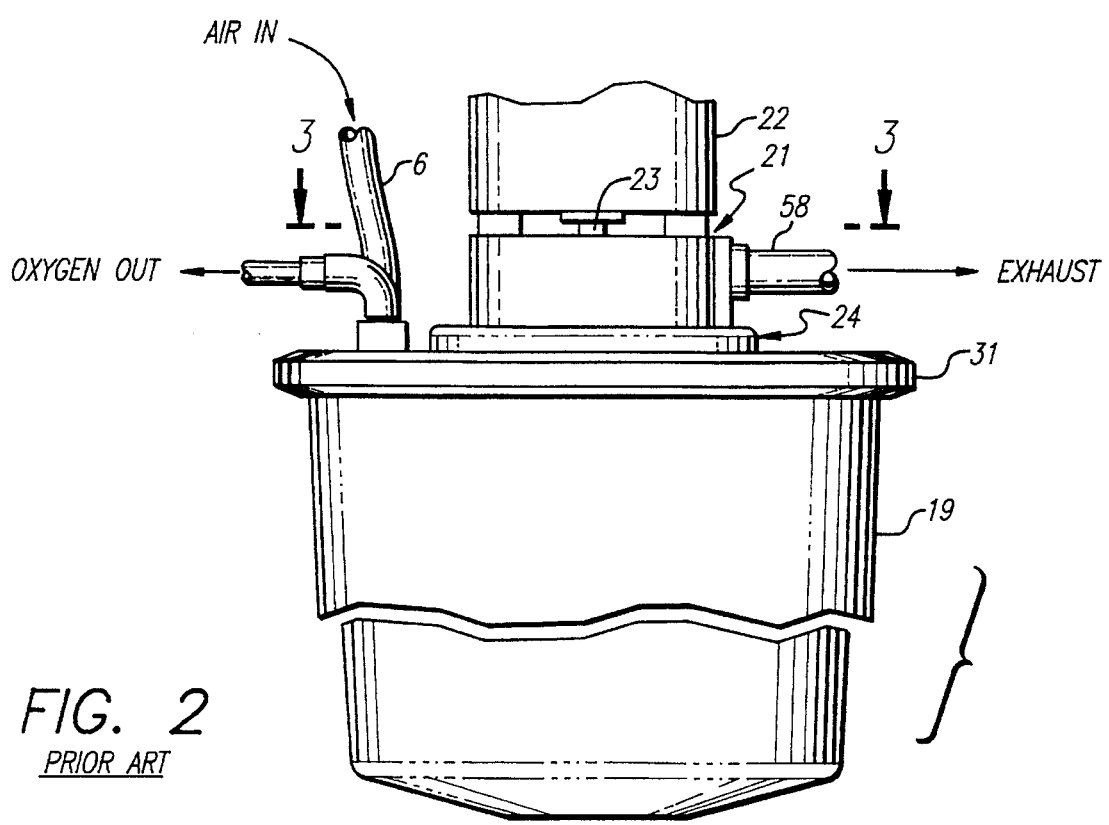
FIG. 2 is a side elevation of a portion of the support system shown in FIG. 1 and particularly shows a fluid fractionator included in such support system.
Figure 3:
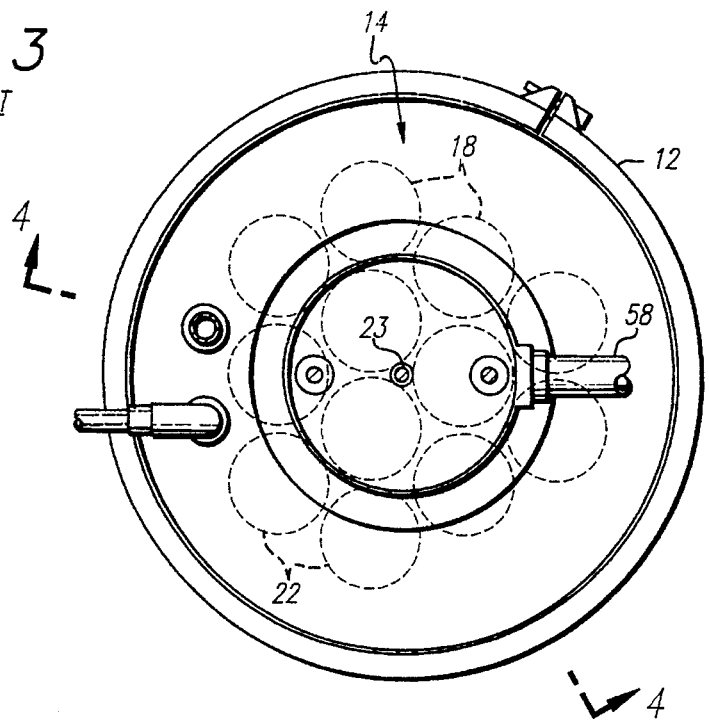
FIG. 3 is a sectional view of the fractionator as taken on a line 3—3 of FIG. 2.

As shown in FIG. 3, the holding tank 19 contains a cluster or array of the adsorber columns 18 within its housing. The columns are preferably disposed in a closely packed configuration. Preferably a plurality, more than two (2), of such columns are provided in a closely packed relationship. Twelve (12) columns are shown in FIG. 3 but it will be appreciated that any other number may be provided. The fluid fractionator 20 also includes a rotary valve distributor assembly generally indicated at 21 (FIG. 2), a gear motor 22 having a drive shaft 23 and a two-piece manifold 24 (FIG. 2).

Each of the columns 18 may be in the form of a cylinder. Each of the columns 18 contains a bed packed with adsorbent material 25 (FIG. 4) which is selective for a particular molecular species of fluid or contaminant. For example, zeolite 5A may constitute the adsorbent material 25 when oxygen is to be separated from air. The packed bed is held in place by a plate 26 at the bottom of the bed. A pressure-dropping means such as a small orifice 27 extends through the plate 26. Perforated plates 28 are disposed at the top and bottom of the bed of the adsorbent material 25, the bottom plate 28 being disposed between the plate 26 and the adsorbent material 25.

A spring 29 is disposed in the column 18 above the upper perforated plate 28 to maintain the plates 28 and the adsorbent material 25 in a packed relationship against the plate 26. When the adsorbent material 25 is zeolite 5A, the material adsorbs all of the components (including nitrogen) in the compressed air and passes argon and oxygen. The oxygen and argon are thus able to pass through the perforated plates 28, the adsorbent material 25 and the orifice 27 in the plate 26.

Figure 4:
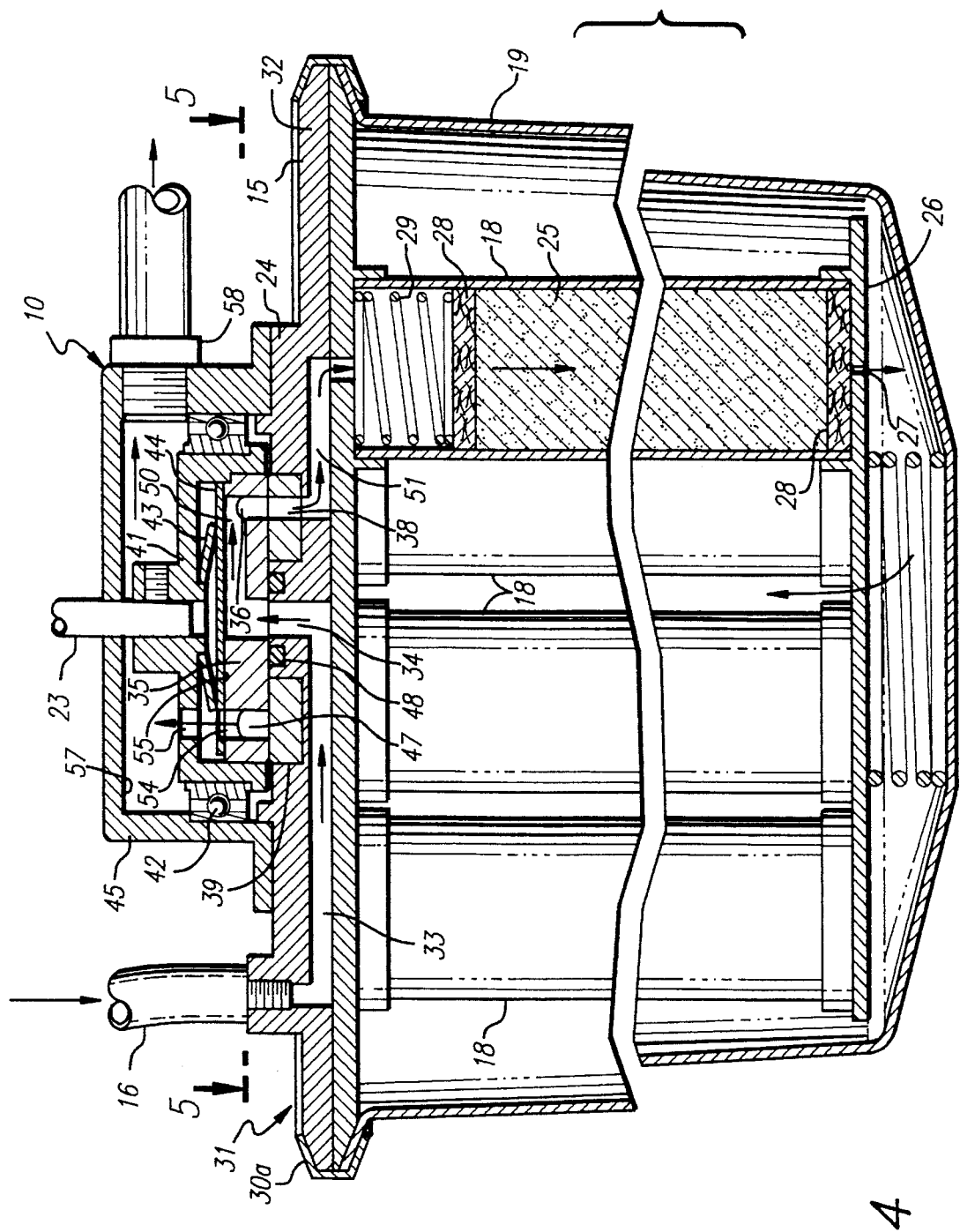
FIG. 4 is a sectional view of the fluid fractionator as taken on a line 4—4 of FIG. 3.
Figure 5:
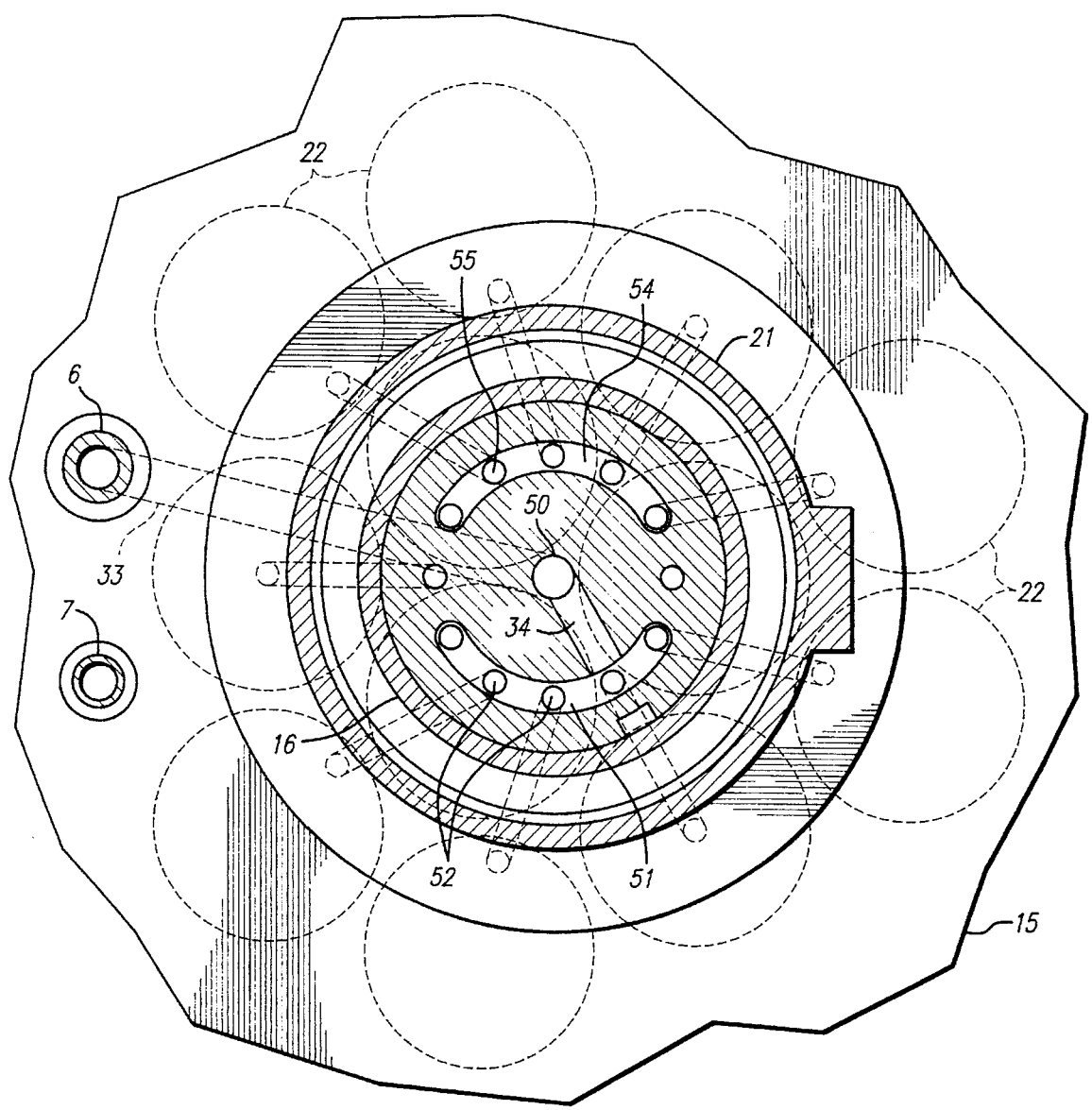
FIG. 5 is an enlarged sectional view of the fluid fractionator as taken on a line 5—5 of FIG. 4.

The rotary valve distributor assembly 21 is affixed to the holding tank 19 by a clamp band 30a (FIG. 4). The rotary distributor valve assembly 21 shown in FIG. 4 includes the two-piece manifold 31 which is ported and channeled. The manifold 31 has a top section 32 which is ported and channeled to receive a stream of fluid through the inlet port 16 and to channel the fluid through an air feed passage 33 into a centrally located inlet port 34 in a ported rotor shoe 35. Subsequently the fluid exiting the rotor shoe 35 is channeled radially from a circular array of inlet ports 38 in a port plate 39 toward each of the columns 18.

The ported rotor shoe 35 is included in a rotor 41. The rotor turns in a circumferential ball bearing unit 42. The rotor is driven by the gear motor 22 (FIG. 2) at a suitable speed such as approximately two (2) revolutions per minute. A conical disc or Belleville spring 43 urges a cover plate 44 and the rotor shoe 35 downwardly to secure the cover plate and the rotor shoe in position. The rotor 41 and its associated components are enclosed within a cover 45 which is suitably attached to the manifold 24.

The port plate 39 is made from a suitably hard material. The port plate 39 is recessed into the top of the manifold 31 and is sealed and immobilized by a slot and a key. The port plate 39 is coaxial with the exit port of an air feed channel 47 in the manifold 31. The port plate 39 has a number of holes equally spaced from one another in a circular pattern. This number is equal to the number of entry ports of channels to the individual columns 18. An air inlet rotary seal 48 is provided in the manifold 31 at a position interior to the port plate 39.

The rotor shoe 35 is made from a material known in the art to be suitable for use with the hardened material of the port plate 39. The rotor shoe 35 slides on the port plate 39. The Belleville spring 43 presses the rotor shoe 35 against the port plate 39 during such sliding movement. There are three (3) channels in the rotor shoe 35. One is a pressurizing channel or air feed channel 50 (FIGS. 4 and 5) which originates at the central fluid inlet port 34. The port 50 radiates into an arcuate slot 51 which provides a conduit simultaneously into several of the annularly positioned ports 52 (FIG. 5) in the port plate 39. As the rotor shoe 35 rotates, each new port 52 communicating with the forward end of the arcuate slot 51 is pressurized by the compressed fluid. At the same time, the port 52 at the rear end of the slot 51 is depressurized.

In a second channel in the rotor shoe 35, an arcuate slot 54 (FIGS. 5 and 6) receives the adsorbed fluid components in the columns 18 which communicate with the exhaust ports. As previously described, when compressed air is the fluid and is introduced to the columns 18, the desorbed fluid components include all of the gases in air except oxygen and argon. The desorbed components in the columns 18 are vented upwardly from the arcuate slot 54 through an exhaust port 55 (FIGS. 4 and 6) in the rotor shoe cover plate 44 into a rotor void space. The desorbed fluid then passes into the atmosphere through an exhaust port 58.

Figure 6:
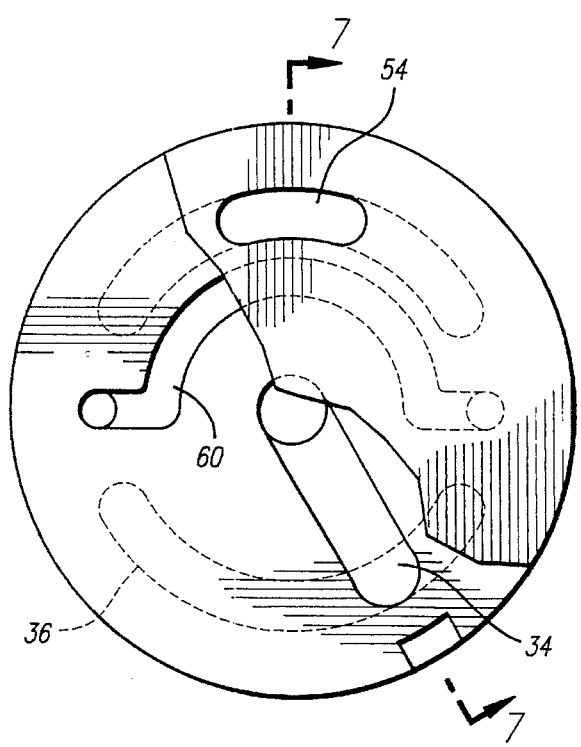
FIG. 6 is a top plan view, partially cut away, of a rotor shoe included in the fluid fractionator.
Figure 7:
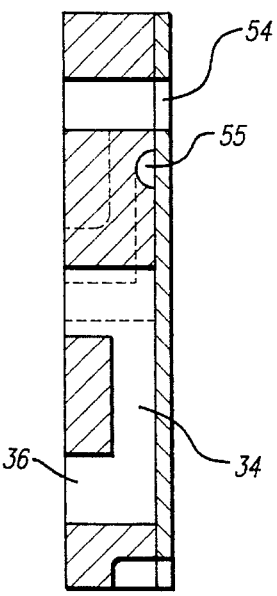
FIG. 7 is a sectional view of the rotor shoe as taken on the line 7—7 of FIG. 6.
Figure 8:
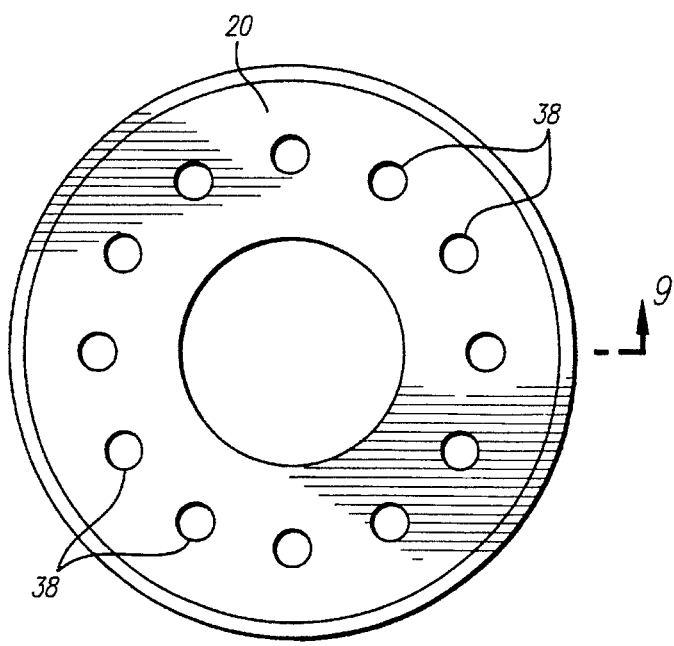
FIG. 8 is a top plan view of a port plate included in the fluid fractionator shown in FIGS. 1–7.
Figure 9:
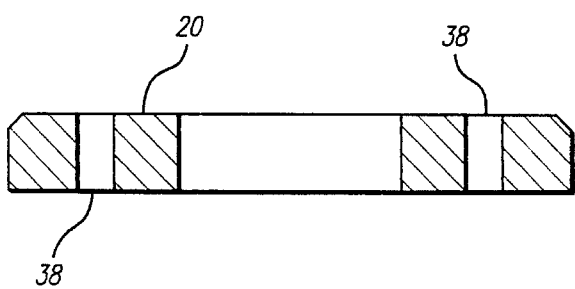
FIG. 9 is a sectional view taken on the line 9—9 of FIG. 8.

The third channel in the rotor shoe 35 is a cross-port channel 60 (FIG. 6). The channel 60 serves as a conduit between two (2) of the columns 18, these two (2) columns being in transition between the pressurizing and desorbing phases of a cycle. Its function is to apply equalizing pressures in columns transitioning between the adsorbing pressure in each cycle. The equalizing pressure provides for a pressure drop in fluid in each column before such column enters the desorption phase in each cycle. This prevents a very rapid decompression in each column and thus prevents an excessively high flow of the desorbed fluid initially from the column. This enhances the concentration of the particular component such as oxygen and argon in each column.

The apparatus described above is disclosed and claimed in U.S. Pat. No. 5,268,021 issued on Dec. 7, 1993, to Charles C. Hill and Theodore B. Hill for a "Fluid Fractionator" and assigned of record to the assignee of record of this application. It has several important advantages over the prior art. It provides a smoother operation than the prior art because several of the columns 18 are receiving the fluid under pressure at any instant and several of the other columns 18 are exhausting the desorbed fluid to the atmosphere at that instant. Thus, any transition of a column from an adsorbing operation to a desorbing operation at any instant will not produce as great a transitory pulse in operation as in the prior art since several other columns will be adsorbing and several other columns will be desorbing at that instant. Furthermore, the equalization of the pressure in the columns 18 in transition will also tend to reduce transitory pulses. These factors tend to enhance the efficiency in the operation of the apparatus and to reduce the noise in the operation of the apparatus. The reduction in the noise results from the equalization in pressure provided by the channel 60 and the relatively large number of columns.

In spite of the advantages discussed in the previous paragraph, there is room for improvement in the fluid fractionator 20 and in the system 10 including such fluid fractionator. In that system, the positive displacement compressor 13 operates at a constant maximum speed regardless of the flow rate and concentration of the oxygen that the patient desires or needs. The compressor 13 and the motor driving the compressor consume a large amount of power when they operate at a maximum speed. For example, the consumption of a home size oxygen concentrator is on the order of approximately four thousand (4000) kilowatt-hours per year. This amounts to a cost in electricity of several hundred dollars per year. This is a significant amount of money to most families and particularly to families of elderly or retired patients or to patients who are unable to work because of such ailments as asthma or emphysema. The continuous operation of the compressor 13 at a maximum power is also disadvantageous because it limits the operative life of the compressor and the motor driving the compressor.

Home oxygen concentrators generally have a capacity of providing oxygen in a range to approximately six liters per minute (6 LPM) of oxygen flow to the patient. The flow rate of oxygen required by an individual patient is prescribed by the patient's physician. The most common prescription rate is two liters per minute (2 LPM). The prescription is ordinarily for continuous administration twenty four hours (24 hr.) per day year-in and year-out. As the disease of some patients progresses to later stages, the oxygen flow rates prescribed for some patients may be increased. When the flow rate prescribed is less than the maximum rate, the reduced rate is obtained in the prior art by throttling the oxygen flowing to the user (e.g. the patient).

It will be appreciated that not all of the oxygen in the product tank 19 flows to the patient even when the oxygen flows to the patient at a rate of approximately six (6) liters per minute. Even at this flow rate, a substantial portion of the oxygen and the argon in the product tank 19 flows to the columns 18 which are being desorbed. This flow of oxygen and argon facilitates the purging of the desorbed gases in such columns. In this way, the columns are ready to receive the compressed air in the next cycle of operation.

As will be appreciated, oxygen and argon flow through the columns 18 to the product tank. Oxygen constitutes approximately twenty one percent (21%) of air and argon constitutes approximately one percent (1%) of air. When oxygen and argon flow through the columns 18, oxygen comprises approximately ninety four percent (94%) of the product in the oxygen tank. This increased concentration of argon (approximately six percent (6%)) in the product tank 19 has no harmful effect on the patient since argon is a noble, inert gas.

This invention provides a system for adjusting the flow characteristics of the compressor 13 in accordance with the product flow rate desired or prescribed. For example, when the compressor 13 has a variable speed, the speed of the compressor may be varied in accordance with the flow rate desired or prescribed. A variable speed compressor drive may take different forms including the following:

1. An alternating current (AC) induction motor with a variable frequency/variable voltage supply. This may be the preferred embodiment.

2. A direct current motor (brushless preferred).

3. A pole-changing AC induction motor for two (2) or three (3) operating speeds.

4. A fixed speed AC motor with a continuously variable mechanical transmission.

Figure 10:
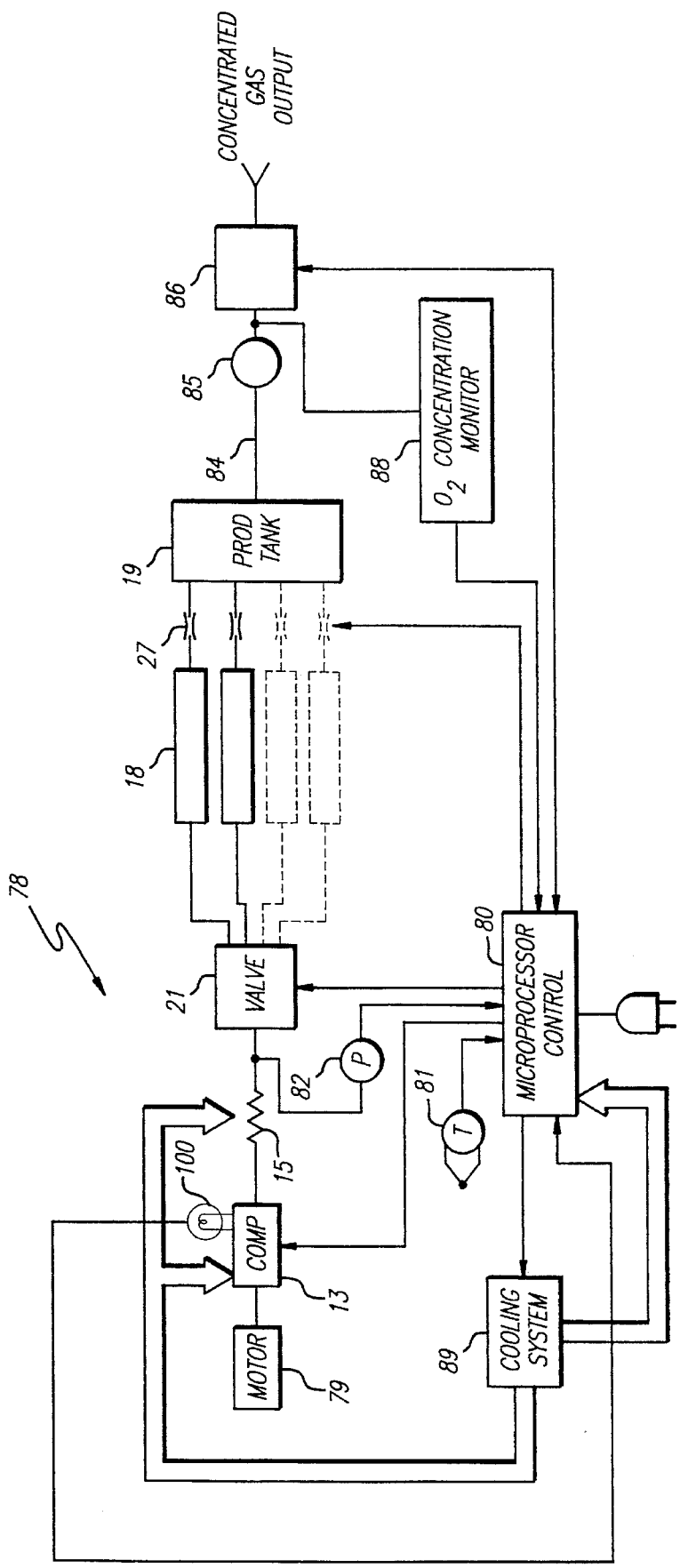
FIG. 10 is a schematic diagram of a closed loop system constituting one embodiment of an invention for use with the fluid fractionator shown in FIGS. 1–9 for regulating the variable characteristics of a compressor and other components to obtain a desired or prescribed rate of flow and concentration of a particular fluid component such as oxygen.

All of the above are considered to be within the scope of the invention. A variable speed motor 79 for the compressor 13 is shown in FIG. 10.

A variable displacement compressor may also be considered to be within the scope of the invention. Such a compressor may include the following:

1. A rotary vane compressor with a variable displacement in an adjustment in the rotor eccentricity.

2. A variable angle swash plate drive for an axial piston compressor.

3. A piston compressor having a crank shaft drive with a variable throw.

FIG. 10 schematically illustrates a system generally indicated at 78 and constituting an embodiment of the invention for regulating the desired flow rate of the oxygen to the patient. The system shown in FIG. 10 includes the heat exchanger 15, the compressor 13, the columns 18, the orifices 27 in the columns and the product tank 19, all shown in FIG. 1, and the rotary valve distributor assembly 21 shown in FIG. 2. The system shown in FIG. 10 also includes a control 80 which is pre-set to any desired value in accordance with the flow rate desired or prescribed for the particular component such as oxygen. This setting may be provided in accordance with the values indicated in a look-up table. The control 80 may preferably be a microprocessor control.

The microprocessor control 80 may be influenced by an indication from a temperature sensor 81 the output of which is introduced to the control. The microprocessor control 80 may be further influenced by an indication from a pressure sensor 82 the output of which is introduced to the control.

The particular component such as oxygen (and argon) flows from the product tank 19 through a line 84. A regulator 85 may be provided in the line 84 to reduce the pressure of the particular component (e.g. oxygen) flowing from the product tank 19 because there may be a significant change in the pressure of the particular component in the product tank over the flow range which may be provided from the compressor 13.

The particular component (e.g. oxygen) then flows through a flow control device 86 to the patient. The flow control device 86 may provide an additional regulation, such as a fine control, over the rate at which the particular component such as oxygen flows to the user such as the patient. The rate of flow of the particular component through the flow control device 86 is introduced to the microprocessor control 80. A concentration monitor 88 may determine the purity of the particular component such as oxygen through the line 84 at each instant and may indicate this determination to the microprocessor.

As will be seen, the microprocessor control 80 is regulated on a closed loop basis by the temperature of the concentrated fluid passing to the columns 18, the pressure of such concentrated fluid, the speed of the compressor 13, the output of the concentration monitor 88 and the rate of flow of the particular component through the flow control device 86. All of these inputs to the microprocessor control 80 cause the control to adjust the speed of the compressor 13 to produce a flow of the particular fluid component to the user at the desired or prescribed rate. The valve 21 is also adjusted to control the rate at which air is introduced into the columns 18.

The regulated output from the control 80 may also be introduced to a cooling system 89 which regulates the temperature of the compressor 13 and the heat exchanger 15. The output from the microprocessor control 80 may also be introduced to the flow control device 86 to regulate the operation of the flow control device in producing the flow of the particular fluid component to the user at the desired or prescribed value. The output of the control 80 may be additionally introduced to the orifices 27 to regulate the size of the orifices. This is desirable since the rate of flow of the particular fluid component can be regulated by regulating the size of the orifices. This will be described in detail subsequently.

The system shown in FIG. 10 and described above has certain important advantages including the following:

1. There is a significant reduction in power consumption because of the reduced speed for the compressor 13 at reduced flow rates of the particular fluid component such as oxygen. The reduction in the power consumption also results from the reduced speed of the motor 79 driving the compressor 13.

2. The amount of noise produced by the fluid fractionator 20 (or oxygen concentrator) is significantly reduced. This results in part from the reduced speed of the compressor 13 and the motor 79. It also results in part from the fact that the desorption of the adsorbed fluid components to the atmosphere is initiated from a reduced pressure of the desorbed fluid components in each column 18.

3. Because of the reduced compression of the fluid in the columns 18, the temperature rise in the compressed fluid is reduced. This provides for a reduction in the operation of the cooling system 89 and a resultant reduction in the power for operating the cooling system.

4. A power supply can be included which operates at all frequencies and voltages in all markets with substantially equal effectiveness in the different markets.

5. The life of the compressor 13 is significantly increased because the compressor is operated at a reduced speed.

6. There is reduced vibration in the system. This also contributes to a long life in the system.

7. The size and weight of the compressor 13 and the motor 79 can be reduced, particularly when the compressor is to be operated at relatively low speeds. Furthermore, if and when the compressor is to be operated at maximum speeds, it would probably be for only relatively short periods of time. This would allow the compressor 13 and the motor 79 to be operated above their rated speed without damaging the compressor 13 or the motor 79. This is another reason why the size and weight of the compressor 13 and the motor 79 can be considerably reduced in most instances.

8. The timing of the rotary valve distributor assembly 21 and the opening of the orifice 27 can be tailored for all flow rates to provide an optimal operation of the system.

9. There is a potential to compensate for a reduced compressor inlet density as a result of a high ambient temperature or a high altitude. This will be discussed in detail subsequently.

The timing of the rotary distributor valve assembly can be provided in various ways. One alternative is that a synchronous motor can be provided with a variable frequency drive as the motor 22 (not shown in FIG. 10 but shown in FIG. 11). Other alternatives involve the use of a stepper motor as the motor 22 or a DC gear motor to drive the rotary valve distributor assembly 21. Another alternative is to provide a pneumatic actuation with speed sensitive to compressor speed. The valve timing can be controlled by a microprocessor for motors responsive to a microprocessor control or by digital/analog circuits in the controller.

Regulating the speed of the rotary distributor valve assembly 21 in accordance with the variations in the speed of the compressor 13 may be desirable under certain circumstances. As the speed of the compressor 13 is decreased while maintaining the speed of the distributor valve assembly 21 constant, the pressure of the fluid in the columns 18 is decreased. This causes the pressure of the nitrogen and the other components adsorbed in the molecular sieves in the columns 18 to decrease.

In FIG. 15, progressive speeds of the compressor are shown on the horizontal axis and progressive concentrations of oxygen in the fluid in the product holding tank 19 are shown on the vertical axis. As will be seen at 130 in FIG. 15, the concentration of the oxygen in the mixture in the product holding tank 19 remains substantially constant at a value of approximately ninety four percent (94%) for compressor speeds between approximately nine hundred revolutions per minute (900 rpm) and thirteen hundred revolutions per minute (1300 rpm). At compressor speeds progressively below approximately nine hundred revolutions per minute (900 rpm), the concentration of the oxygen in the mixture in the product holding tank 19 becomes progressively reduced. At compressor speeds of approximately six hundred revolutions per minute (600 rpm), the concentration of the oxygen in the mixture in the holding tank 19 is approximately eighty eight percent (88%).

It is desirable to maintain the concentration of the oxygen in the mixture in the product holding tank 19 at a value of at least ninety percent (90%) regardless of the speed of the compressor 13. This can be accomplished by decreasing the rotary speed of the distributor valve assembly 21 as the speed of the compressor 13 is decreased. By decreasing the rotary speed of the distributor valve assembly 21, each column 18 is provided with an increased time to receive air under pressure from the compressor 13. As a result, the pressure of the air in each column 18 increases and the pressure of the oxygen and argon in the product holding tank 19 correspondingly increases. This inhibits nitrogen in the columns 18 from passing into the product holding tank 19. In this way, the concentration of the oxygen in the product holding tank 19 can be maintained at a value of at least ninety percent (90%) even as the flow rate of the oxygen and nitrogen into the product holding tank decreases. FIG. 15 also shows at 132 the flow rate of the oxygen at different compressor speeds. As will be seen, the flow rate of the oxygen to the patient in liters per minute increases substantially linearly with increased compressor speeds.

Figure 13:
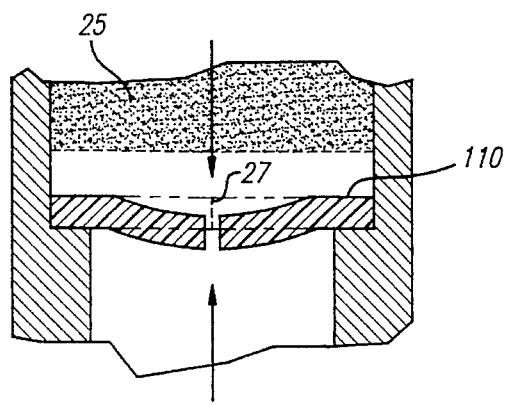
FIG. 13 is a schematic sectional view of an orifice which may be used in the respiratory support system of this invention and which provides variable characteristics in accordance with the rate of flow of the particular fluid component such as oxygen.

FIG. 17 illustrates at 134 the relationship between flow rates of the fluid from the compressor 13 and the compressor discharge pressure in psig for a normal system of the prior art. FIG. 17 also illustrates at 136 the relationship between flow rates of the fluid from the compressor 13 and the compressor discharge pressure for a system which includes certain features of applicants' system. These include the rotary valve distributor assembly 21 operating at variable speeds and the valve providing a variable orifice as shown in FIG. 13. As shown in FIG. 17, operation of the system of this invention is advantageous over the systems of the prior art because it provides significantly higher compressor discharge rates throughout most of the range of the compressor flow rates.

FIG. 11 illustrates a simplified system for controlling the rate of flow of a fluid such as oxygen to a user such as a patient. The system includes the compressor 13, the columns 18, the product tank 19, a microprocessor control 101 corresponding to the control 80 in FIG. 10, the oxygen concentration monitor 88, the rotary valve distributor assembly 21 and the motor 22 (not shown) for driving the valve distributor assembly 21. The compressor 13 may be a wobble piston compressor and the motor 22 may be a synchronous gear motor. A flow control 90 corresponding to the flow control 85 may be included for controlling the rate of flow of the particular fluid component such as oxygen to a user such as a patient. The flow control 90 may be a standard flow control or it may be electronic. A regulator such as the regulator 85 may be included in the line between the product tank 19 and the flow control device 90.

The system shown in FIG. 11 senses the rate of oxygen flow in the monitor 88 and introduces this sensed rate to the microprocessor control 101. The microprocessor control 101 then varies the operation of the compressor 13, the motor 22 and the flow control 90 to regulate the rate of flow of the oxygen to the patient at the desired or prescribed rate. The system shown in FIG. 11 operates on a closed loop basis to provide the desired regulation of the oxygen flow. As will be seen, the system shown in FIG. 11 does not include such controls as the temperature sensor 81, the pressure sensor 82 and the cooling system 89.

FIG. 12 illustrates an open loop system for regulating the rate of oxygen flow to the patient. As will be seen, the system shown in FIG. 12 is similar to the system shown in FIG. 11 except that it eliminates the lines from the microprocessor control 101 to the oxygen monitor 88, the compressor 13 and the motor 79. In this system, the microprocessor control 101 indicates a desired flow of oxygen to the patient. The compressor 13, the motor 79 and the flow control 90 are then set to desired values for obtaining this desired oxygen flow. The oxygen monitor 88 is then read during the operation of the system. On the basis of this reading, adjustments are made manually in the compressor 13, the motor 79 and the flow control 90 to obtain the desired or prescribed rate of oxygen flow to the patient. These adjustments may be made on the basis of a look-up table establishing individual values for these parameters under different sets of conditions.

The systems shown in FIGS. 10, 11 and 12 may include an indicator 100 for indicating when certain components such as the compressor 13 have to be replaced. As will be appreciated, the operation of the systems shown in FIGS. 10, 11 and 12 may become degraded with time as a result of a number of factors. These include dirty filters, compressor wear, motor wear and pneumatic leaks. The systems shown in FIGS. 10, 11 and 12 compensate for these system degradations by increasing the compressor flow to maintain the purity/concentration of the particular fluid component such as oxygen at the desired or prescribed flow rate. The indicator 100 indicates when the speed or other variable characteristics of the compressor 13 as sensed by the indicator 100 exceed particular limits for the rate of fluid flow desired or prescribed.

As shown in FIG. 13, the orifice 27 in each column 18 may be formed from a molded elastomeric material 110 such as rubber. As the pressure of the particular fluid component such as oxygen flowing through the orifice 27 decreases, the elastomeric material 110 defining the orifice 27 has a decreased flexure. This decreases the size of the orifice 27 in each column 18. In this way, the orifice 27 in each column 18 becomes closed with decreases in the pressure of the fluid such as oxygen. This provides an increase in the pressure of the fluid in the column 18. This is desirable at low rates of oxygen flow to the patient to maintain the oxygen concentration in the oxygen holding tank at a value of at least ninety percent (90%). By decreasing the size of the orifice 27 at these low flow rates, the pressure of the fluid in the columns 18 is increased. The concentration of the oxygen holding tank 19 is accordingly maintained at a value of at least ninety percent (90%).

Figure 14:
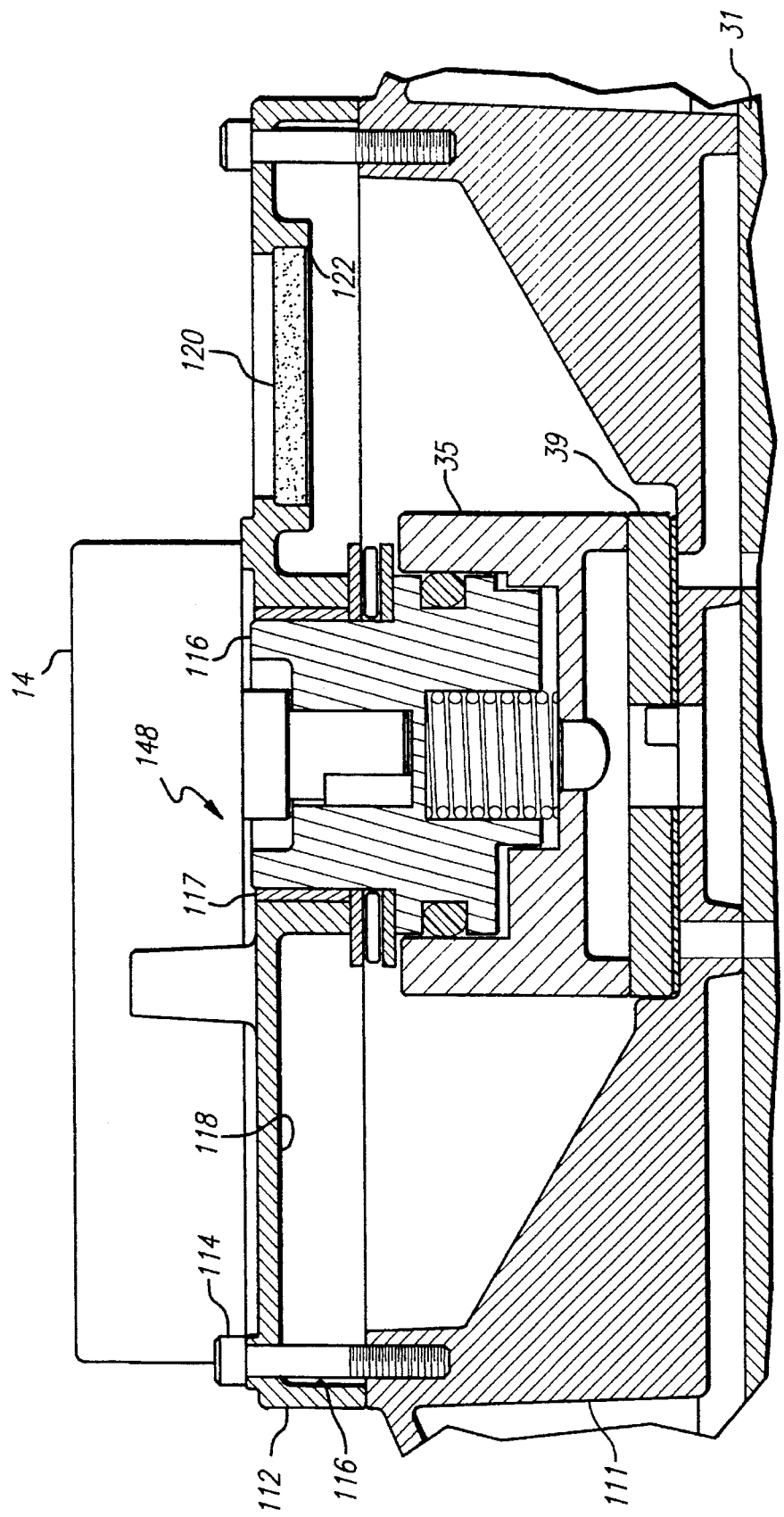
FIG. 14 is an elevational view, partially in section, of apparatus which may be included in the invention to reduce the noise generated in the system when fluid adsorbed in the fluid fractionator is desorbed.

In the embodiment shown in FIGS. 1–9, the desorbed fluid components are passed through the chamber 57 and the exhaust port 58 to the atmosphere. This causes a relatively loud noise to be produced every time that the desorbed fluid in one of the columns 18 is released to the chamber 57 and from the chamber to the exhaust port 58. FIG. 14 shows an arrangement for significantly reducing the noise produced every time that the adsorbed fluid in one of the columns 18 is desorbed.

The embodiment shown in FIG. 14 includes the port plate 39, the rotor shoe 35, and the manifold 31. The manifold 31 has a cover 111. A bearing carrier 112 is suitably attached to the manifold cover 111 as by screws 114. A rotor shaft 116 is disposed within an opening in the bearing carrier 112 and a bearing 117 is disposed between the bearing carrier 112 and the bearing shaft 116.

The bearing carrier 112 and the manifold cover 111 define a chamber 118 which is enlarged relative to the embodiment shown in FIGS. 1–7. The desorbed fluid from each column 18 passes into the chamber 118 and is retained in the enclosure since an exhaust port corresponding to the exhaust port 58 is not provided in the embodiment shown in FIG. 14. Porous plugs 120 are disposed in apertures 122 in the bearing carrier 112. Since the desorbed fluid in the chamber 118 is under some pressure, it is slowly released to the atmosphere through the porous plugs 120.

The decrease in noise in the operation of the system shown in FIG. 14 results from several factors. One factor is the increased volume of the chamber 118 relative to the corresponding chamber 57 shown in FIG. 4. A second factor is that the desorbed fluid in the chamber 118 is retained within the chamber and is released slowly to the atmosphere through the plugs 120. This is facilitated by the fact that the desorbed fluid in the chamber 118 is not released to the atmosphere through a port such as the port 58 in FIG. 4.

It will be appreciated that all of the features of this invention can be provided in a conventional two (2) column system of the prior art. Such a conventional two (2) column system is shown in FIG. 16. It includes the compressor 13, a distributor valve 148, a pair of the columns 18, the orifices 27, the product holding tank 19 and a control valve 150 for controlling the rate at which the oxygen or argon flow to the user (e.g. the patient).

It will also be appreciated that the systems constituting this invention can be used to provide other fluids than oxygen and to provide such fluids to users other than a patient without departing from the scope of the invention. For example, the system of this invention can be used to provide fluids for industrial purposes. One use illustratively is to provide nitrogen to industrial organizations which provide an inert atmosphere. Another illustrative use is oxygen for welding.

The apparatus constituting this invention has several important advantages. It provides for a controlled and adjustable speed of the compressor 13 to adjust the rate of flow of a fluid such as oxygen to a user (e.g. a patient). The adjustable control of the compressor speed can be either on a closed loop basis or an open loop basis. Furthermore, an indication can be provided as to when the compressor speed has been adjusted out of a normal range of values to obtain a prescribed flow of the fluid, such as oxygen to the user (e.g. patient), at a required purity.

The apparatus of this invention also has other advantages. As the speed of the compressor becomes reduced below a particular value, the concentration of the oxygen tends to become reduced below a desirable value. The apparatus of this invention provides for an adjustment in the rotary speed of the distributor valve assembly 21 in the fluid fractionator 20 to increase the pressure of the fluid in the columns 18 in the fluid fractionator 20. The adjustable orifices 27 at the outlet of the fluid fractionator 20 also tend to close with decreases in the pressure of the fluid in the fluid fractionator 20, thereby maintaining the pressure of the fluid in the columns 18 in the fluid fractionator.

As the speed of the compressor 13 is decreased, the noise generated by the compressor decreases. The noise in the fluid fractionator 20 is also significantly decreased by providing the porous plugs 120 in the bearing carrier 112 and by increasing the size of the chamber 118. In this way, the desorbed components in the chamber 118 provide a minimal noise when they enter the chamber and when they leak slowly into the atmosphere from the chamber.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for removing a first component from a compressed fluid also having a second component and for providing for the flow of such first component to a user at a prescribed rate, a plurality of columns constructed to provide initially for the introduction of the compressed fluid into such columns and to adsorb the second component of the compressed fluid in such columns and to pass the first component in such columns and constructed to desorb the second component in such columns, first means for compressing the fluid before the introduction of the compressed fluid into the columns in the plurality, second means for providing for the introduction of the compressed fluid into at least a first one of the columns in the plurality on a cyclic basis to obtain the adsorption of the second component in such at least first one of the columns and the passage of the first component from such at least first one of the columns and for providing for the passage of the compressed fluid from at least a second one of the columns in the plurality on the cyclic basis to obtain the desorption of the second component from such at least second one of the columns, third means for collecting the first component passing through the at least first one of the columns in the plurality on the cyclic basis, and fourth means having variable characteristics for providing for the compression of the fluid by the first means at a variable rate of flow dependent upon the prescribed rate of the first component through the at least first one of the columns in the plurality.

2. In a combination as set forth in claim 1, the variable characteristics of the fourth means constituting variations in speed, the fourth means being operatively coupled to the first means for varying the compression provided on the fluid by the first means in accordance with the variations in the speed of the fourth means, the fourth means being operable at the variable speed to obtain the prescribed rate of flow of the first component through the at least first one of the columns, the fourth means being operative to obtain the operation of the first means at the variable speed dependent upon the prescribed rate of flow of the first component through the at least first one of the columns in the plurality.

3. In a combination as set forth in claim 1, the first means including a rotatable member with characteristics variable to vary the rate of flow of the first component through the at least first one of the columns in the plurality, and the fourth means being operatively coupled to the first means for obtaining a variation in the compression of the fluid by the first means to obtain the prescribed rate of flow of the first component through the at least first one of the columns.

4. In a combination as set forth in claim 1, means for controlling the desorption of the second component components in the at least second one of the columns in the plurality.

5. In a combination as set forth in claim 1, means for decreasing the compression of the fluid in the at least first one of the columns in the plurality in accordance with decreases in the rate of flow of the first component through such at least first one of the columns.

6. In combination for removing a first component from a compressed fluid also having a second component and for providing for the flow of such first component to a user at a prescribed rate, a plurality of columns wherein at least a first one of such columns adsorbs the second component in the compressed fluid and passes the first component in the compressed fluid and at least a second one of which desorbs the second component previously adsorbed in such column, valve means for providing for the selection of the at least first one of the columns in the plurality and the at least second one of the columns in the plurality on a cyclic basis, compressor means for receiving and compressing the fluid and for introducing the compressed fluid to the at least first one of the columns in the plurality in accordance with the operation of the valve means, first means for adjusting the operation of the compressor means to the prescribed magnitude of flow rate for the passage of the first component through the at least first one of the columns in the plurality, and second means for collecting the first component passing through the at least first one of the columns in the plurality.

7. In a combination as set forth in claim 6, third means for providing a controlled adjustment by the first means in the compression provided by the compressor means in the fluid to adjust the rate of flow of the first component through the at least first one of the columns in the plurality.

8. In a combination as set forth in claim 6, the compressor means having variable characteristics to adjust the compression provided by the compressor means, and the first means including third means for adjusting the variable characteristics of the compressor means in accordance with the prescribed rate of flow of the first component through at least the first one of the columns in the plurality.

9. In a combination as set forth in claim 8, a product tank for holding the first component after the passage of the first component through the at least first one of the columns in the plurality, and means responsive to changes in the concentration of the first component in the at least first one of the columns in the plurality for adjusting the characteristics of the valve means to maintain the concentration of the first component in the product tank at a particular value.

10. In a combination as set forth in claim 6, at least a third one of the columns in the plurality providing for an equalization of the pressure in the at least first one of the columns and the at least second of the columns when such columns are being transitioned on the cyclic basis between the at least first one of the columns in the plurality and the at least second one of the columns in the plurality.

11. In a combination as set forth in claim 6, the valve means being rotary.

12. In a combination as set forth in claim 6, the valve means communicating on the cyclic basis with the at least first one of the columns in the plurality and the at least second one of the columns in the plurality at a rate dependent upon the rate of flow of the first component through the at least first one of the columns in the plurality to adjust the compression of the fluid in the at least first one of the columns in the plurality.

13. In a combination as set forth in claim 6, means for minimizing any noise in the at least second one of the columns in the plurality during the desorption of the second component in the at least second one of the columns in the plurality.

14. In combination for removing a first component from a compressed fluid also having a second component and for providing for the flow of such first component to a user at a prescribed rate, a plurality of columns constructed to provide initially for the introduction of compressed fluid into such columns and to adsorb the second component in the compressed fluid and to pass the first component in the compressed fluid through such columns and constructed to desorb the second component in such columns after the passage of the first component through such columns, compressor means having variable characteristics for compressing the fluid for introduction to the columns in the plurality, control means for varying the characteristics of the compressor means in accordance with the prescribed rate of flow of the first component through the columns in the plurality, and rotary valve means for selecting at least a first one of the columns in the plurality on a cyclic basis to provide for the introduction of the compressed fluid into such at least first one of the columns and for selecting at least a second one of the columns in the plurality on the cyclic basis to provide for the desorption of the second component in such at least second one of the columns.

15. In a combination as set forth in claim 14, means for varying the rotary speed of the rotary valve means in accordance with the prescribed rate of flow of the first component through the at least first one of the columns in the plurality.

16. In a combination as set forth in claim 15, each individual one of the columns in the plurality having an orifice for passing the first component from such individual one of the columns, the orifice in each individual one of the columns being adjustable in accordance with the rate of flow of the first component through such individual one of the columns.

17. In a combination as set forth in claim 14, each individual one of the columns in the plurality having an orifice for passing the first component from such individual one of the columns, the orifice in each individual one of the columns being adjustable in accordance with the rate of flow of the first component through such individual one of the columns.

18. In a combination as set forth in claim 14, the second component in each individual one of the columns being desorbed to the atmosphere at a variable rate, and means for varying the rate at which the second component in each individual one of the columns is desorbed to the atmosphere.

19. In a combination as set forth in claim 14, means for boosting the pressure of the fluid in the at least first one of the columns in the plurality upon an occurrence of decreases in the rate of flow from the prescribed rate of the first component through the at least first one of the columns in the plurality.

20. In combination for removing a first component from a compressed fluid also having a second component and for providing for the flow of such first component to a user at a prescribed rate, a plurality of columns constructed to receive the compressed fluid and to adsorb the second component in the compressed fluid in such columns and to pass the first component in the compressed fluid in such columns and constructed to desorb the second component in such columns after the passage of the first component through such columns, valve means for selecting at least a first one of the columns in the plurality on a cyclic basis to provide for the introduction of the compressed fluid into such at least first one of the columns on the cyclic basis and the adsorption of the second component in the compressed fluid in the at least first one of the components and the passage of the first component through such at least first one of the columns and for selecting at least a second one of the columns in the plurality on the cyclic basis to provide for the desorption of the second component from such at least second one of the columns, first means for providing a compression of the fluid passing to the at least first one of the columns in the plurality in accordance with the operation of the valve means, and second means for varying the rate of flow of the first component through the at least first one of the columns independently of the operation of the valve means and in accordance with variations in the prescribed rate of flow of the first component through the at least first one of the columns in the plurality.

21. In a combination as set forth in claim 20, means for varying the rate on the cyclic basis, independently of the operation of the first means, at which the at least first one of the columns in the plurality and the at least second one of the columns in the plurality are selected by the valve means.

22. In a combination as set forth in claim 20, the valve means constituting first valve means, a plurality of second valve means each disposed in an individual one of the columns in the plurality and each operative in response to variations from the prescribed rate of flow of the first component through the at least first one of the columns in the plurality to vary the pressure of the fluid in the at least first one of the columns in the plurality.

23. In a combination as set forth in claim 20, third means defining a chamber for receiving the second component in the at least second one of the columns in the plurality, and fourth means included in the third means for providing a controlled passage of the second component from the chamber.

24. In a combination as set forth in claim 23, the third means including a cover, the fourth means including a porous plug disposed in the cover for providing for a controlled flow to the atmosphere of the second component in at least the second one of the columns in the plurality in the chamber.

25. In a combination as set forth in claim 23, means for varying the rate on the cyclic basis, independently of the operation of the first means, at which the at least first one of the columns in the plurality and the at least second one of the columns in the plurality are selected by the valve means.

26. In a combination as set forth in claim 25, the valve means constituting first valve means, a plurality of second valve means each individual one of which is disposed in an individual one of the columns in the plurality and each individual one of which is operative in response to the variations from the prescribed rate of flow of the first component through the at least first one of the columns in the plurality to vary the pressure of the fluid in the at least first one of the columns in the plurality.

27. In combination for removing a first component from a compressed fluid also having a second component and for providing for the flow of such first component to a user at a prescribed rate, a plurality of columns constructed to receive the compressed fluid and to adsorb the second component in the compressed fluid in such columns and to pass the first component in the compressed fluid through such columns and constructed to desorb the second component in such columns after the passage of the first component through such columns, valve means for selecting at least a first one of the columns in the plurality on a cyclic basis to provide for the introduction of the compressed fluid into such at least first one of the columns on the cyclic basis and for selecting at least a second one of the columns in the plurality on the cyclic basis to provide for the desorption of the second component in such second one of the columns, first means for introducing the compressed fluid into the at least first one of the columns in the plurality, second means defining a chamber for receiving the desorbed second component in the at least second one of the columns in the plurality, and third means for providing a controlled release to the atmosphere of the second component in the chamber.

28. In a combination as set forth in claim 27, the second means including a cover enclosing the valve means and the columns in the plurality, and the third means including a porous plug communicating at one end with the chamber and at an opposite end with the atmosphere to pass the second component in the chamber to the atmosphere.

29. In a combination as set forth in claim 28, fourth means operative independently of the introduction of the compressed fluid by the first means into the at least first one of the columns in the plurality for varying the rate at which the valve means selects the at least first one of the columns in the plurality and the at least second one of the columns in the plurality on the cyclic basis.

30. In a combination as set forth in claim 27, fourth means for varying the operation of the first means in introducing the compressed fluid into the at least first one of the columns in the plurality independently of the operation of the valve means.

31. In a combination as set forth in claim 27, fourth means operative independently of the introduction of the compressed fluid by the first means into the at least first one of the columns in the plurality for varying the rate at which the valve means selects the at least first one of the columns in the plurality on the cyclic basis and the at least second one of the columns in the plurality on the cyclic basis.

32. In a combination as set forth in claim 27, a plurality of valves, each individual one of the valves being disposed in an individual one of the columns in the plurality and each individual one of the valves having a variable orifice to pass the first component in the at least first one of the columns through such individual one of the valves and each individual one of the valves being constructed to vary the orifice in such individual one of the valves, in accordance with changes in the rate of flow of the first component through the orifice in such individual one of the values, in a direction to increase the pressure of the fluid in the individual one of the columns in the plurality, the valves in the plurality being different from the valve means.

33. In combination for removing a first component from a compressed fluid also having a second component and for providing for the flow of such first component to a user at a prescribed rate, a plurality of columns constructed to provide initially for the introduction of the compressed fluid into such columns and to adsorb the second component in the compressed fluid in such columns and to pass the first component through such columns and constructed to desorb the second component in such columns after the passage of the first component through such columns, first means for compressing the first and second components of the fluid before the introduction of such compressed components of the fluid into the columns in the plurality, second means for introducing the compressed fluid into at least a first one of the columns in the plurality on a cyclic basis to obtain the adsorption of the second component in the at least first one of the columns and the passage of the first component through such at least first one of the columns and for providing for the desorption of the second component from an at least second one of the columns in the plurality on the cyclic basis, third means for collecting the first component passing through the at least first one of the columns in the plurality on the cyclic basis, fourth means including a cover defining a closed chamber for receiving the second component in the at least second one of the columns in the plurality, and fifth means disposed in the cover for controllably releasing to the atmosphere the second component in the closed chamber.

34. In a combination as set forth in claim 33, the fifth means including at least a first porous plug for releasing to the atmosphere the second component in the chamber.

35. In a combination as set forth in claim 33, the first component being introduced into the at least first one of the columns in the plurality at a variable rate, sixth means for adjusting to a prescribed rate the variable rate at which the first component is introduced into the at least first one of the columns by the second means.

36. In a combination as set forth in claim 33, a plurality of orifices, each individual one of the orifices being disposed in an individual one of the columns in the plurality and each individual one of the orifices having a variable constriction and each individual one of the orifices being operative to provide an increasing constriction with decreases in the rate of flow of the first component through the at least first one of the columns in the plurality.

37. In a combination as set forth in claim 33, means for varying the rate of flow of the first component through the at least first one of the columns in the plurality, and means for varying the fluid compression provided by the first means in accordance with the variations in the rate of flow of the first component through the at least first one of the columns in the plurality.

38. In combination for removing a first component from a compressed fluid also having a second component and for providing for the flow of such first component to a user at a prescribed rate, a plurality of columns constructed to provide initially for the introduction of the compressed fluid into such columns and to adsorb the second component in such columns and to pass the first component and constructed to desorb the second components in such columns after the passage of the first component through such columns, first means for compressing the first and second components of the fluid before the introduction of such compressed components of the fluid into the columns in the plurality, second means for introducing the compressed fluid into at least a first one of the columns in the plurality on a cyclic basis to obtain the adsorption of the second component in the at least first one of the columns and the passage of the first component through such at least first one of the columns and for providing for the passage to the atmosphere of the second component from at least a second one of the columns in the plurality on the cyclic basis to obtain the desorption of such second component from the at least second one of the columns, third means for collecting the first component passing through the at least first one of the columns in the plurality on the cyclic basis, fourth means for adjusting the concentration of the first component in the at least first one of the columns in the plurality, and a plurality of valves, each individual one of the valves being disposed in an individual one of the columns in the plurality and each individual one of the valves having an orifice variable in accordance with changes in the rate of flow of the first component through the at least first one of the columns in the plurality.

39. In a combination as set forth in claim 38, the orifice in the individual one of the valves in the at least first one of the columns being constructed to become constricted with decreases in the rate of flow of the first component through the at least first one of the columns in the plurality from the prescribed rate and with decreases in the compression of the first component in the at least first one of the columns in the plurality to adjust the concentration of the first component in the at least first one of the columns.

40. In a combination as set forth in claim 39, the fourth means being operative to adjust the rate of flow of the compressed fluid into the at least first one of the columns in the plurality on the cyclic basis to adjust the concentration of the first component in the at least first one of the columns.

41. In a combination as set forth in claim 39, the second means being operative to adjust the rate of flow of the first component through the at least first one of the columns in the plurality on the cyclic basis and the rate of the passage to the atmosphere of the second component from the at least second one of the columns in the plurality on the cyclic basis.

42. In a combination as set forth in claim 41, valve means operable on the cyclic basis at a variable rate to increase the compression of the first component in the at least first one of the columns in the plurality in accordance with decreases in the rate of flow of the first component through the individual one of the orifices in such at least first one of the columns.

43. In combination for removing a first component from a compressed fluid also having a second component and for providing for the flow of such first component to a user at a prescribed rate, a plurality of columns constructed to provide initially for the introduction of the compressed fluid into such columns and to adsorb the second component in the fluid in such columns and to pass the first component through such columns and constructed to desorb the second component in such columns after the passage of the first component through such columns, first means for providing a variable compression of the fluid before the introduction of the compressed fluid to the columns in the plurality, the first means having variable characteristics of providing such compression, second means for introducing the compressed fluid into at least a first one of the columns in the plurality on a cyclic basis to obtain the adsorption of the second component in such at least first one of the columns and to obtain the passage of the first component through such at least first one of the columns and for providing for the passage of the second component from at least a second one of the columns in the plurality on the cyclic basis to obtain the desorption of the second component from the at least second one of the columns, third means for adjusting the characteristics of the first means to obtain a particular concentration of the first component in the at least first one of the columns in the plurality, and fourth means for indicating when the characteristics of the first means are outside of particular limits.

44. In a combination as set forth in claim 43, fifth means defining a closed loop with the first means and the third means for maintaining the particular concentration of the first component in the at least first one of the columns in the plurality.

45. In a combination as set forth in claim 44, a valve associated with the columns in the plurality for communicating with such columns in the plurality on the cyclic basis to select the at least first one of the columns in the plurality on the cyclic basis and the at least second one of the columns in the plurality on the cyclic basis, and means for varying the operation of the valve to adjust the time, in accordance with the adjustments in the particular concentration of the first component in the at least first one of the columns in the plurality, in which each individual one of the columns in the plurality operates as the at least first one of the columns in the plurality on the cyclic basis and as the at least second one of the columns in the plurality on the cyclic basis.

46. In a combination as set forth in claim 45, a plurality of valve means, each individual one of the valve means being associated with an individual one of the columns in the plurality for increasing the compression of the fluid in such individual one of the columns in the plurality in response to a decrease in the rate of flow of the first component through the at least first one of the columns in the plurality, the valve being different from the plurality of valve means.

47. In combination for removing a first component from a compressed fluid also having a second component and for providing for the flow of such first component to a user at a prescribed rate, a plurality of columns wherein at least a first one of such columns adsorbs the second component in the compressed fluid and passes the first component in the compressed fluid and at least a second one of such columns desorbs the second component previously adsorbed in such at least second one of the columns, valve means for selecting the at least first one of the columns on a cyclic basis and the at least second one of the columns on a cyclic basis, compressor means having variable characteristics for receiving and compressing the fluid in accordance with the variations in such characteristics and for introducing the compressed fluid to the at least first one of the columns in the plurality in accordance with the selection of the first one of the columns by the valve means on the cyclic basis, first means for indicating variations in the temperature of the fluid in the at least first one of the columns, and second means for varying the characteristics of the compressor means in accordance with the variations in the temperature indicated by the first means to maintain the flow of the first component in the compressed fluid to the user at the prescribed rate.

48. In a combination as set forth in claim 47, third means for adjusting the times for the selection of the at least first one of the columns on the cyclic basis and the at least second one of the columns on the cyclic basis in accordance with the variable characteristics of the compressor means by the second means.

49. In a combination as set forth in claim 47, a plurality of orifices, each individual one of the orifices being disposed in an individual one of the columns in the plurality and being variable in size, and third means for varying the size of the orifices in the plurality in accordance with variations in the compression of the fluid in the columns in the plurality.

50. In a combination as set forth in claim 47, third means for indicating the variations in the pressure of the fluid in the columns in the plurality, the second means being responsive to the indications by the third means of the variations in the pressure of the fluid in the columns in the plurality for varying the characteristics of the compressor means.

51. In a combination as set forth in claim 47, third means associated with the columns in the plurality for defining a chamber for receiving the second component desorbed from the columns in the plurality, and fourth means included in the third means for providing a controlled release of the second component in the chamber to an atmospheric pressure.

52. In a combination as set forth in claim 47, a plurality of orifices, each individual one of the orifices being disposed in an individual one of the columns in the plurality and being variable in size, third means for varying the size of the orifices in the plurality in accordance with variations in the operation of the compressor means in compressing the fluid in the columns in the plurality, fourth means for indicating variations in the pressure of the fluid in the columns in the plurality, the second means being responsive to the indications by the fourth means of the variations in the pressure of the fluid in the columns in the plurality for varying the characteristics of the compressor means, fifth means associated with the columns in the plurality for defining a chamber for receiving the second component desorbed from the columns in the plurality, and sixth means included in the fifth means for providing a controlled release of the second component in the chamber to atmospheric pressure.

53. In combination for removing a first component from a compressed fluid also having a second component and for providing for the flow of such first component to a user at a prescribed rate, a plurality of columns wherein at least a first one of such columns adsorbs the second component of the compressed fluid and passed the first component of the compressed fluid through the at least first one of the columns, valve means for selecting the at least first one of the columns on a cyclic basis and the at least second one of the columns on the cyclic basis, compressor means having variable characteristics for receiving and compressing the fluid in accordance with the variations in such characteristics and for introducing the compressed fluid to the at least first one of the columns in the plurality in accordance with the selection of the at least first one of the columns by the valve means on the cyclic basis, flow control means for receiving the first component passing through at least the first one of the columns and for passing the first component to the user at a particular rate dependent upon the operation of the flow control means, and first means responsive to variations in the rate at which the flow control means passes the first component to the user for varying the characteristics of the compressor means to maintain at the particular rate the passage of the first component from the flow control means to the user.

54. In a combination as set forth in claim 53, second means for indicating variations in the temperature of the fluid in the at least first one of the columns, the first means being responsive to the variations in the temperature as indicated by the second means for adjusting the characteristics of the first means to maintain at the particular rate the passage of the first component from the flow control means to the user.

55. In a combination as set forth in claim 53, second means for adjusting the times for the selection of the at least first one of the columns on the cyclic basis and the at least second one of the columns on the cyclic basis in accordance with the variations in the characteristics of the compressor means by the first means.

56. In a combination as set forth in claim 55, the compressor means having a variable speed, means for increasing the pressure of the first component passing from the least first one of the columns in accordance with decreases in the speed of the compressor means.

57. In a combination as set forth in claim 56, third means for indicating variations in the temperature of the fluid in the at least first one of the columns, the first means being responsive to the indications by the third means of the variations in the temperature for adjusting the characteristics of the first means to maintain at the particular rate the passage of the first component from the flow control means to the user, fourth means for adjusting the times for the selection of the at least first one of the columns on the cyclic basis and the at least second one of the columns on the cyclic basis in accordance with the variations in the characteristics of the compressor means by the first means.

58. In a combination as set forth in claim 53, a plurality of orifices, each individual one of the orifices being disposed in an individual one of the columns in the plurality and being variable in size, and second means for varying the size of the orifices in the plurality in accordance with variations in the compression of the fluid in the columns in the plurality.

59. In a combination as set forth in claim 53, the compressor means having a variable speed, means for increasing the pressure of the first component passing from the least first one of the columns in accordance with decreases in the speed of the compressor means.

60. In a combination as set forth in claim 53, second means associated with the columns in the plurality for defining a chamber for receiving the second component desorbed from the columns in the plurality, and third means included in the second means for providing a controlled release of the second component in the chamber to atmospheric pressure.

61. In combination for removing a first component from a compressed fluid also having a second component and for providing for the flow of such first component to a user at a prescribed rate, a plurality of columns wherein at least a first one of such columns adsorbs the second component of the compressed fluid and passes the first component of the compressed fluid through the at least first one of the columns and at least a second one of such columns desorbs the second component previously adsorbed in the at least first one of the columns, valve means for selecting the at least first one of the columns on a cyclic basis and the at least second one of the columns on the cyclic basis, compressor means having variable characteristics for receiving and compressing the fluid in accordance with the variations in such characteristics and for introducing the compressed fluid to the at least first one of the columns in the plurality in accordance with the selection of the at least first one of the columns by the valve means on the cyclic basis, flow control means for receiving the first component passing through the at least first one of the columns and for passing the first component to the user, the flow control means having variable characteristics, and first means responsive to the variations in the characteristics of the compressor means for varying the characteristics of the flow control means to maintain the passage of the first component from the flow control means to the user at a particular rate.

62. In a combination as set forth in claim 61, second means for indicating variation, in the temperature of the fluid in the at least first one of the columns, and third means responsive to the indications of the variations in the temperature by the second means for varying the characteristics of the compressor means to maintain the passage of the first component to the user at the particular rate.

63. In a combination as set forth in claim 62, fourth means for indicating variations in the pressure of the fluid in the first component in the at least first one of the columns, fifth means responsive to the indications of the variations in the pressure by the second means for varying the characteristics of the compressor means to maintain the passage of the first component to the user at the particular rate, sixth means for indicating the variations in the characteristics of the flow control means, and the fifth means being responsive to the indication by the sixth means of the variations in the characteristics of the flow control means for varying the characteristics of the compressor means to maintain the passage of the first component from the flow control means to the user at the particular rate.

64. In a combination as set forth in claim 61, second means for indicating variations in the pressure of the fluid in the at least first one of the components, third means responsive to the indications of the variations in the pressure by the second means for varying the characteristics of the compressor means to maintain the passage of the first component to the user at the particular rate.

65. In a combination as set forth in claim 61, second means for indicating the variations in the characteristics of the flow control means, and third means responsive to the indications by the second means of the variations in the characteristics of the flow control means for varying the characteristics of the compressor means to maintain the passage of the first component from the flow control means to the user at the particular rate.

66. In combination for removing a first component from a compressed fluid also having a second component and for providing for the flow of such first component to a user at a prescribed rate, a plurality of columns wherein at least a first one of the columns adsorbs the second component of the compressed fluid and passes the first component of the compressed fluid through the at least first one of the columns and at least a second one of the columns desorbs the second component previously adsorbed in the at least first one of the columns, valve means for selecting the at least first one of the columns on a cyclic basis and the at least second one of the columns on the cyclic basis, compressor means having variable characteristics for receiving and compressing the fluid in accordance with the variations in such characteristics and for introducing the compressed fluid to the at least first one of the columns in the plurality in accordance with the selection of the at least first one of the columns by the valve means on the cyclic basis, first means having variable characteristics for cooling the compressor means in accordance with such variable characteristics, and second means responsive to variations in the characteristics of the compressor means for varying the characteristics of the first means in cooling the compressor means.

67. In a combination as set forth in claim 66, flow control means for receiving the first component after the passage of the first component through the at least first one of the columns and for passing the first component to the user, the flow control means having variable characteristics, and third means responsive to the variations in the characteristics of the compressor means for varying the characteristics of the flow control means to maintain the passage of the first component from the flow control means to the user at a particular rate.

68. In a combination as set forth in claim 66, the second means including a microprocessor, the variable characteristics of the compressor means constituting changes in speed, the variable characteristics of the cooling means constituting changes in the rate at which the cooling means cools the compressor means, the second means including the microprocessor being responsive to the changes in the speed of the compressor means for varying the rate at which the cooling means cools the compressor means.

69. In a combination as set forth in claim 68, the valve means having variable characteristics for varying the rate at which the valve means selects the at least first one of the columns on the cyclic basis and the at least second one of the columns on the cyclic basis, and third means including the microprocessor for varying the characteristics of the valve means in accordance with the variations in the speed of the compressor means.

70. In a combination as set forth in claim 68, third means for indicating variations in the temperature of the compressor means, and fourth means including the microprocessor for varying the speed of the compressor means in accordance with the indication by the third means of the variations in the temperature of the compressor means.

71. In a combination as set forth in claim 68, third means for indicating variations in the concentration of the first component in the at least first one of the columns, and fourth means including the microprocessor for varying the speed of the compressor means in accordance with the indications by the third means of the variations in the concentration of the first component in the at least first one of the columns.

72. In a combination as set forth in claim 68, flow control means for receiving the first component after the passage of the first component through the at least first one of the columns and for passing the first component to the user, the flow control means having variable characteristics, third means responsive to the variations in the characteristics of the compressor means for varying the characteristics of the flow control means to maintain the passage of the first component from the flow control means to the user at a particular rate, the valve means having variable characteristics for varying the rate at which the valve means selects the at least first one of the columns on the cyclic basis and the at least second one of the columns on the cyclic basis, fourth means including the microprocessor for varying the characteristics of the valve means in accordance with the variations in the speed of the compressor means, fifth means for indicating variations in the temperature of the compressor means, and sixth means including the microprocessor for varying the speed of the compressor means in accordance with the indication of variations in the temperature of the compressor means, seventh means for indicating variations in the concentration of the first component in the at least first one of the columns, and eighth means including the microprocessor for varying the speed of the compressor means in accordance with the indications representing the variations in the concentration of the first component in the at least first one of the columns.

* * * * *